(12) United States Patent
Cruz-Albrecht et al.

(10) Patent No.: US 8,659,656 B1
(45) Date of Patent: Feb. 25, 2014

(54) HYPERSPECTRAL IMAGING UNMIXING

(75) Inventors: Jose Cruz-Albrecht, Oak Park, CA (US); Peter Petre, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 393 days.

(21) Appl. No.: 12/902,419

(22) Filed: Oct. 12, 2010

(51) Int. Cl.
*H04N 7/18* (2006.01)
*H03M 1/00* (2006.01)
*H03M 1/12* (2006.01)

(52) U.S. Cl.
USPC ............................ 348/142; 341/138; 341/155

(58) Field of Classification Search
USPC .................................. 348/142; 341/138, 155
See application file for complete search history.

(56) References Cited

U.S. PATENT DOCUMENTS

| | | | | |
|---|---|---|---|---|
| 5,309,183 | A * | 5/1994 | Sasaki et al. | 348/231.7 |
| 7,403,144 | B1 * | 7/2008 | Cruz-Albrecht et al. | 341/143 |
| 7,724,168 | B1 | 5/2010 | Cruz-Albrecht et al. | |
| 2001/0043153 | A1 * | 11/2001 | Gordon et al. | 341/143 |
| 2002/0012451 | A1 * | 1/2002 | Lin | 382/103 |
| 2002/0159098 | A1 * | 10/2002 | Kleiman | 358/474 |
| 2006/0233421 | A1 * | 10/2006 | Portigal et al. | 382/103 |
| 2006/0290549 | A1 * | 12/2006 | Laroia et al. | 341/143 |

OTHER PUBLICATIONS

Han et al., "Hyperspectral Endmember Detection and Unmixing Based on Linear Programming", pp. 1763-1766, IEEE, 2003.*
Donoho, Compressed Sensing, IEEE Transactions on Information Theory, vol. 52, No. 4, Apr. 2006, (18 pgs).
Keshava et al., Spectral Unmixing, IEEE Signal Processing Magazine, Jan. 2002, (14 pgs).
Lazar et al., Perfect Recovery and Sensitivity Analysis of Time Encoded Bandlimited Signals, IEEE Transactions on Circuits and Systems—1:Regular Papers, vol. 51, No. 10, Oct. 2004, (14 pgs).
Keshava, A Survey of Spectral Unmixing Algorithms, Lincoln Laboratory Journal, vol. 14, No. 1, 2003, (24 pgs).
Xia et al., A Recurrent Neural Network for Solving Nonlinear Convex Programs Subject to Linear Constraints, IEEE Transactions on Neural Networks, vol. 16, No. 2, Mar. 2005, (8 pgs).

\* cited by examiner

*Primary Examiner* — Anner Holder
*Assistant Examiner* — On S Mung
(74) *Attorney, Agent, or Firm* — Toler Law Group, PC (57) ABSTRACT

Methods, circuits, and systems for time encoder-based unmixing of hyperspectral imaging data are disclosed. A method of unmixing hyperspectral imaging data includes receiving mixed image data of one or more pixels. The mixed image data is generated by an imaging device that captures hyperspectral data. The mixed image data includes sensed spectral band intensities of materials in an area represented by a particular pixel. The mixed image data is converted from first analog domain signals into pulse domain signals. A solution to a mixing equation in the pulse domain is generated to identify abundances of one or more of the materials based on the sensed spectral band intensities. The sensed spectral band intensities are compared to reference spectral band intensities of a set of considered materials. The solution is converted from a pulse domain into an analog domain as second analog domain signals.

30 Claims, 6 Drawing Sheets

HYPERSPECTRAL IMAGING UNMIXING

FIELD OF THE DISCLOSURE

The present disclosure is generally related to unmixing hyperspectral imaging data.

BACKGROUND

Aerial imaging and analysis of surface features is used in many disciplines including, for example, geography, geology, climatology, surveillance, reconnaissance, and intelligence. Imaging data may be gathered to identify the materials or "endmembers" that are present in an area of a surface under study. The materials present may be identified by performing spectral analysis of the imaging data and comparing spectral data to known spectral signatures.

Picture elements or "pixels" in the imaging data may each represent an area that includes multiple materials. When image data includes spectra of multiple materials, the image data may be referred to as "hyperspectral imaging data." For example, a single pixel may represent several square meters of surface area, which may include a number of materials. To determine what materials are represented in the single pixel, the hyperspectral imaging data may be "unmixed" to determine an abundance of each of the materials present.

Unmixing hyperspectral imaging data can be a complex and resource-intensive operation. Thus, significant computing resources may be required to unmix hyperspectral imaging data.

SUMMARY

Embodiments disclosed herein include methods, circuits, and systems for unmixing of hyperspectral imaging data. The hyperspectral imaging data may include imaging data for one or more pixels where each of the one or more pixels represents an area of a surface being imaged. When the imaging data of a pixel includes spectral information for more than one material, the imaging data may be unmixed to identify an abundance of each of the materials in the area.

In a particular embodiment, the unmixing may be performed using a pulse domain processing system. For example, the imaging data may be converted from analog data into a pulse domain where the converted imaging data is processed by an array of time-based encoders. The imaging data may include intensity information for a number of spectral bands. The intensity information (or "intensities") may be compared to a set of reference information including intensities associated with a number of considered materials in each of a set of reference spectral bands. The considered materials include a set of materials that may be identified in the hyperspectral imaging data based on the reference information (e.g., using spectrochemical analysis techniques). The reference spectral bands include particular portions of the electromagnetic spectrum that are considered to identify characteristic emissions of the considered materials. In various embodiments, the hyperspectral imaging data may be analyzed in an "overconstrained" case or in an "underconstrained" case. In the overconstrained case, the number of spectral bands in which intensities are sensed and for which reference data is available is greater than the number of considered materials or endmembers. In the underconstrained case, the number of spectral bands in which intensities are sensed and for which reference data is available is fewer than the number of considered materials or endmembers.

The abundance of each material in the image data may be generated in real time in the pulse domain, such as aboard a moving platform that carries an imaging device that captures the imaging data. Information regarding the abundance of each of the materials may be converted from the pulse domain into a second set of analog signals for transmission, review, and other purposes.

In a particular embodiment, a method of unmixing hyperspectral imaging data includes receiving mixed image data of one or more pixels. The mixed image data is generated by an imaging device that captures hyperspectral data. The mixed image data includes sensed spectral band intensities from materials in an area represented by a particular pixel. The mixed image data is converted from first analog domain signals into pulse domain signals. A solution to a mixing equation in the pulse domain is generated to identify abundances of one or more of the materials based on the sensed spectral band intensities. The sensed spectral band intensities are compared to reference spectral band intensities of a set of considered materials. The solution is converted from a pulse domain into an analog domain as second analog domain signals.

In another particular embodiment, a hyperspectral unmixing circuit includes an analog domain-to-pulse domain converter to convert hyperspectral image data, including sensed spectral band intensities, from first analog domain signals into pulse domain signals. A pulse domain processing circuit includes one or more non-linear time encoders to generate a solution to a mixing equation in the pulse domain. The solution identifies a plurality of materials corresponding to the sensed spectral band intensities of a particular pixel in the hyperspectral image data based on a set of reference spectral band intensities corresponding to a set of considered materials.

In another particular embodiment, a system includes a movable platform configured to move over a surface. An imaging device is coupled to the movable platform. The imaging device is configured to generate hyperspectral image data including sensed spectral band intensities corresponding to materials on the surface. The system also includes a circuit that is coupled to the movable platform. The circuit includes an analog domain-to-pulse domain converter. The analog domain-to-pulse domain converter is configured to convert the hyperspectral image data received from first analog domain signals to pulse domain signals. The circuit also includes a pulse domain processing circuit that includes one or more non-linear time encoders to generate a solution to a mixing equation in the pulse domain. The solution identifies the materials on the surface based on a set of reference spectral band intensities corresponding to a set of considered materials. The circuit also includes a pulse domain-to-analog domain converter to convert the solution to second analog domain signals indicating the materials on the surface.

In still another particular embodiment, a system includes an analog domain-to-pulse domain converter configured to convert mixed image data from first analog domain signals into pulse domain signals in a pulse domain. The mixed image data represents sensed spectral band intensities of materials in an area represented by a particular pixel. The system also includes a pulse domain processor configured to receive the pulse domain signals and to solve a mixing equation to generate a solution. The solution identifies one or more of the materials in the area based on a set of reference spectral band intensities that correspond to a set of considered materials. The number of reference spectral band intensities is fewer than the number of considered materials. The system also includes a pulse domain-to-analog domain converter configured to convert the solution from the pulse domain into second analog domain signals.

The features, functions, and advantages that are described can be achieved independently in various embodiments or may be combined in yet other embodiments, further details of which are disclosed with reference to the following description and drawings.

DETAILED DESCRIPTION

In accordance with particular embodiments, hyperspectral imaging data may be unmixed in real time. For example, the hyperspectral image data may be unmixed at approximately the same rate at which the hyperspectral image data is captured. To illustrate, when hyperspectral imaging data is captured at a rate of twenty frames per second, the hyperspectral imaging data may be unmixed at a rate of approximately twenty frames per second. Further, particular embodiments enable a determination of abundances of a set of considered materials when the set of considered materials is greater than a number of reference spectral bands (i.e., in an underconstrained case). The hyperspectral imaging data may be converted into a pulse domain and analyzed using one or more arrays of nonlinear time encoders. Unmixing the hyperspectral imaging data in the pulse domain saves time and resources associated with converting the analog data into a digital domain and enables rapid processing of the hyperspectral imaging data. Information generated in the pulse domain (e.g., abundances of various materials) may be converted into analog form to facilitate review or further processing of the data.

Spectral unmixing may be used to determine an abundance of each of a number of materials (or "endmembers") that are present in imaging data for a surface under study captured by a pixel element of an imaging device. Because of a significant distance or altitude between the imaging device and the surface, the pixel element may capture an image that represents a relatively large portion of the surface. Thus, the imaging data from the pixel element may be a "mixed pixel" that includes spectral information associated with multiple different materials. For example, water may reflect light at a first set of characteristic wavelengths. Thus, a reference spectrum for water may include reflectance peaks at wavelengths of the first set of characteristic wavelengths. Likewise, steel may reflect light at a second set of characteristic wavelengths. Thus, a reference spectrum for steel may include reflectance peaks at wavelengths of the second set of characteristic wavelengths. When materials such as water, steel or other materials are included in an area of study, light intensities may be sensed and reference intensities may be maintained for bands at the characteristic wavelengths of these materials, enabling identification of the materials by comparing the sensed intensities to the reference intensities.

Some of the reflectance peaks of one material (e.g., water) may overlap reflectance peaks of another material (e.g., steel). Thus, when a pixel captures imaging data for an area that includes a water surface with a steel ship, some reflectance peaks in the imaging data may include information that indicates a presence of both steel and water. Accordingly, the image data may be unmixed to determine a contribution of steel and a contribution of water to the mixed reflectance peaks. Note that while the imaging data is referred to in this example as including reflectance peaks, in certain embodiments, the imaging data may include emission, transmission or absorption peaks.

The abundance of each of the materials or endmembers is a quantity ranging from 0, when none of a particular material is included in the area represented by a particular pixel, to 1, when the area represented by the particular pixel is represented entirely by a single material. In a particular embodiment, a sum of the abundances of the materials present, whether all of the materials are known or unknown, may be assumed to equal 1 to indicate that the abundances of the materials account for one-hundred percent of the area represented by the particular pixel.

Eq. (1) is a mixing equation that describes a relationship between each of a number of spectral measurements and abundances of materials present:

$$x = S \cdot a + n \quad (1)$$

In Eq. (1), the term x is a vector including a measured spectral intensity value for each of a set of L spectral bands. The term a is a vector including a relative abundance value for each of M considered materials. Each value in the vector a is greater than or equal to zero and less than or equal to one. For example, a value in the vector a is equal to zero when none of the associated material is present in the pixel, and the value in the vector a is equal to one when the pixel includes only the associated material (in which case the pixel is not a mixed pixel). The term n is a noise term associated with the measured spectral intensity or signatures of unknown materials. The term S is a signature matrix specifying reference spectra for the considered materials. Thus, the signature matrix S includes L rows corresponding to sensed spectral bands and M columns corresponding to considered materials. A value in the matrix S indicates a reflectance intensity for a corresponding considered material in a corresponding spectral band. When a set of reference intensities includes a number, L, of sensed spectral bands and spectral bands for which spectral signatures are known, and a number, M, of considered materials, the signature matrix S is an L×M matrix. By expanding the vectors and the signature matrix, the mixing equation of Eq. (1) may be rewritten as given by Eq. (2):

$$\begin{bmatrix} x_1 \\ x_2 \\ \ldots \\ x_L \end{bmatrix} = \begin{bmatrix} S_{11} & \ldots & S_{1M} \\ & \square & \\ \ldots & \ldots & \ldots \\ & \square & \\ S_{L1} & \ldots & S_{LM} \\ & \square & \end{bmatrix} \cdot \begin{bmatrix} a_1 \\ a_2 \\ \ldots \\ a_M \end{bmatrix} + \begin{bmatrix} n_1 \\ n_2 \\ \ldots \\ n_L \end{bmatrix} \quad (2)$$

In Eq. (2), the vector x includes measured intensities values (e.g., $x_1, x_2 \ldots x_L$) for a particular pixel for each of L spectral bands. Each column of the signature matrix S represents a spectral signature in L spectral bands for a particular considered material. Thus, the signature matrix S includes M columns corresponding to the M considered materials, and L rows corresponding to the L spectral bands. The vector a includes abundance values (e.g., $a_1, a_2 \ldots a_m$) of each of the M considered materials. Eq. (2) accounts for noise levels or signatures of unknown materials in each of the L spectral bands being measured using the vector n.

In a particular case, the number of spectral bands, L, is equal to the number of considered materials, M. That is, the signature matrix S is a square matrix. However, there are other cases that may be considered in solving the mixing equations of Eq. (1) and Eq. (2). In an "overconstrained" case, there are more spectral bands L than there are considered materials M. In this case, the signature matrix S has more rows than columns. In an "underconstrained" case, there as more considered materials M than there are spectral bands L. In this case, the signature matrix S has more columns than rows.

In the overconstrained case, the spectral unmixing problem can be formulated as a quadratic programming problem with linear equalities and inequalities as constraints. For example, ignoring noise, the mixing equation of Eq. (1) can be solved as a least squares minimization problem as shown in Eq. (3):

$$\min(|x - S \cdot a|_2) \quad (3)$$

subject to the constraints that:

$$\sum_{j=1}^{M} a_j = 1$$

and $$a_j \geq 0 \text{ for } j = 1, \ldots M$$

In Eq. (3), the vector x includes values of measured intensities for a particular pixel in each of the L spectral bands. Each column of the signature matrix S represents a spectral signature for one of the M materials in the L spectral bands. The vector a includes values of the abundance of each of the M materials. The least squares minimization problem of Eq. (3) may be used to identify values of the vector a that minimize a norm-2 difference between spectral measurements (of the vector x) and a product of the signature matrix S and abundance of the considered materials (of vector a).

The least squares minimization problem of Eq. (3) may be subject to an equality constraint and an inequality constraint. The equality constraint specifies that the values of the vector a sum to one. That is, the equality constraint imposes an assumption that the abundance values of the vector a account for all of the material in the area represented by the particular pixel. The inequality constraint specifies that each of the abundances in the vector a be a positive number. That is, solutions that require a negative abundance of one or more of the considered materials are rejected. The inequality constraint makes the least squares minimization problem a computationally intensive nonlinear optimization problem. As a result, Eq. (3) may be resource intensive to solve in a digital computer system and Eq. (3) may be difficult to solve in real time.

In the underconstrained case, the spectral unmixing problem can be formulated as a quadratic programming problem with inequality and sparsity constraints. For example, a sparsity constraint may be imposed using compressed sensing. Compressed sensing assumes that the number of considered materials, M, is greater than a number of materials that are actually represented in each mixed pixel. That is, no pixel includes spectral data corresponding to all of the considered materials. For example, the underconstrained case may be solved as shown in Eq. (4):

$$\min(|x - S \cdot a|_2, \lambda |a|_1) \quad (4)$$

subject to the constraints that:

$$a_j \geq 0 \text{ and } j = 1, \ldots M$$

Eq. (4) represents a least squares minimization problem subject to a sparsity constraint and an inequality constraint. The least squares minimization problem of Eq. (4) may be used to identify values of the vector a that minimize a sum of a norm-2 value of a difference between spectral measurements (of the vector x) and a product of the signature matrix S and abundance of the considered materials (of vector a), and a norm-1 value of the abundances of the considered materials (of the vector a) multiplied by a tuning factor, $\lambda$. Eq. (4) includes a first term, the norm-2 term that is similar to the norm-2 term of Eq. (3). Eq. (4) also includes a second term that represents the sparsity constraint. The sparsity constraint imposes the requirement that a number of materials present in a particular pixel is fewer than the total number of considered materials, M. The inequality constraint indicates that each of the abundances a should be a positive number. The inequality constraint makes the least squares minimization problem into a computationally intensive nonlinear optimization problem. As a result, Eq. (4) may be resource intensive to solve in a digital computer system and, like Eq. (3), Eq. (4) may be difficult to solve in real time.

Figure 1:
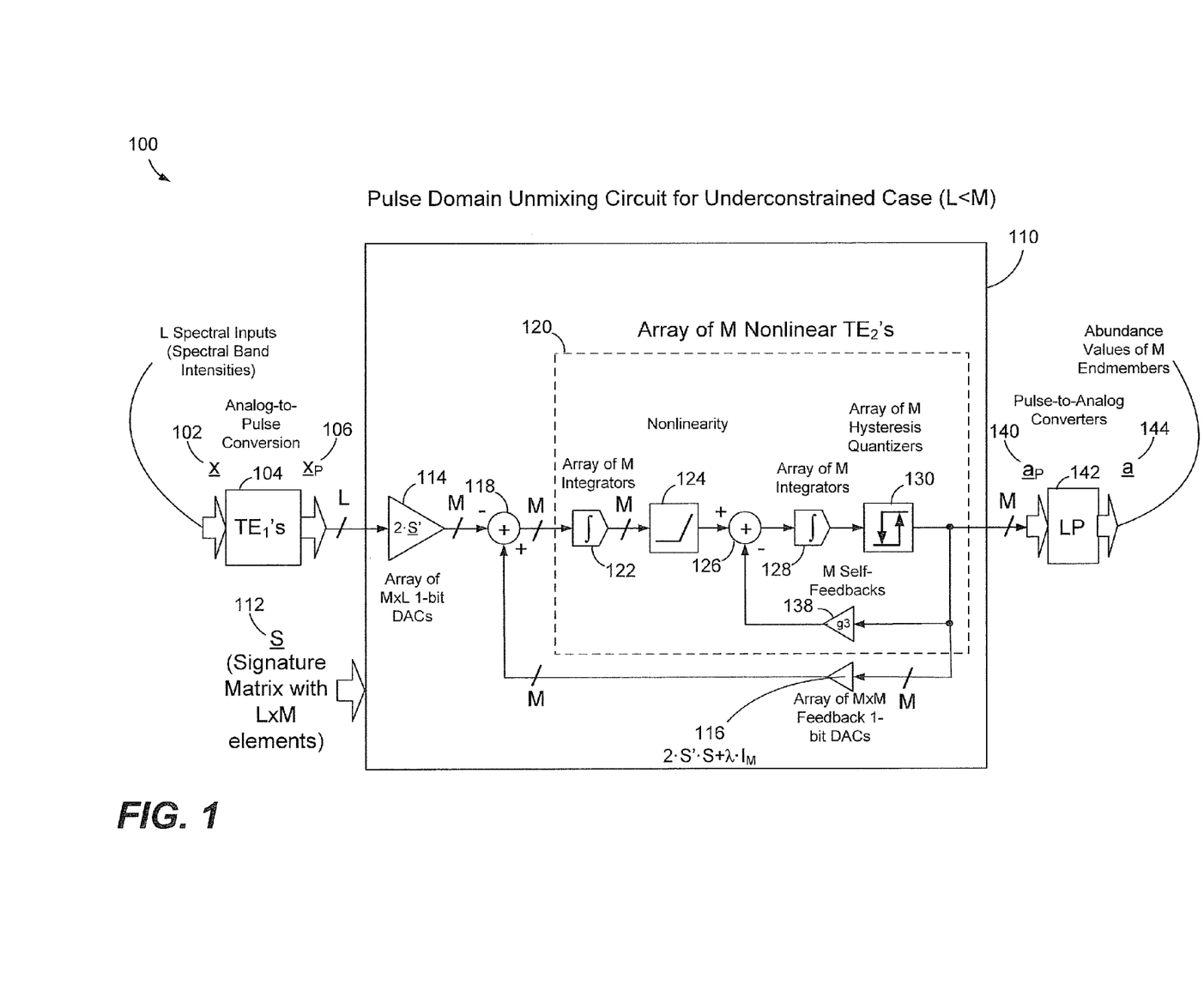
FIG. 1 is a block diagram depicting a particular embodiment of a system configured to unmix hyperspectral data in a pulse domain in an underconstrained case.

Referring to FIG. 1, a particular embodiment of a system 100 to generate a solution to a mixing problem is shown. The particular system 100 illustrated in FIG. 1 is configured to unmix hyperspectral imaging data in an underconstrained case, i.e., where the number of considered materials, M, is greater than the number of spectral bands, L, in which intensity measurements are taken.

Captured analog data 102 is received from an imaging device as a vector, x, having L values that correspond to measured intensity values in each of the L spectral bands being measured. The analog data 102 is presented to a set of first time encoders ("TEs") 104 that convert the analog data 102 into corresponding pulse domain data, $x_p$, 106. In a particular embodiment, the set of first time encoders 104 includes L time encoders, i.e., one time encoder for each of the L spectral bands. The pulse domain data $x_p$ 106 is provided to a pulse domain unmixing circuit 110. The pulse domain unmixing circuit 110 also receives a signature matrix S 112. The signature matrix S 112 includes information regarding spectral bands, L, for each considered material, M.

In the pulse domain unmixing circuit 110, the pulse domain data $x_p$ 106 is presented to a first array of one-bit digital-to-analog converters (DACs) 114. The first array of DACs 114 is configured to multiply the pulse domain data $x_p$ 106 by a transpose of the signature matrix S 112 (denoted as S'). In a particular embodiment, the first array of DACs 114 are further configured to double the weight of the pulse domain data $x_p$ 106, i.e., 2·S'. An output of the first array of DACs 114 includes M values that are applied to negative inputs of a first set of summing junctions 118. A positive input of each of the first set of summing junction 118 receives an output of one of a second array of DACs 116 as a feedback signal from an output of the pulse domain unmixing circuit 110. The second array of DACs 116 is adapted to apply a quantity, 2·S', multiplied by the signature matrix, S. The second array of DACs 116 combines each row of the L rows to yield an output current, $I_M$, that is a sum of the DACs 116 in each respective column of the M columns. The second array of DACs 116 is further adapted to apply a tuning parameter, $\lambda$ to the output currents $I_M$. The resulting feedback signal gives effect to the sparsity constraint of Eq. (4).

Outputs of the summing junctions 118 are presented to an array of M integrators 122 of a second array of nonlinear time encoders 120. To implement the inequality constraint of Eq. (4), an output of the array of M integrators 122 includes a plurality of M nonlinearity elements 124. The nonlinearity elements 124 change a negative input to zero and pass along positive values received. Outputs of the nonlinearity elements 124 are presented to a positive input of a second summing junction 126. Outputs of the pulse domain unmixing circuit 110, i.e., a plurality of self-feedback signals, are received at a negative input of the second summing junction 126. The self-feedback signals are received via rate adjustments 138 that may be used to tune a rate of the self-feedback signals.

Outputs of the second summing junction 126 are presented to a second array of M integrators 128. Outputs of the second array of M integrators 128 are presented to an array of M hysteresis quantizers 130. Outputs of the hysteresis quantizers 130 are a vector $a_p$ of pulse domain abundance values 140. The pulse domain abundance values 140 are presented to M pulse-to-analog converters (e.g., lowpass "LP" filters 142) that generate a vector a of analog domain abundance values 144 in an analog domain. The abundance values 144 represent, in an analog domain, the portions of materials present in the area of study of the particular pixel.

In a particular embodiment, the pulse domain unmixing circuit 110 of FIG. 1 may be implemented in a single chip-scale device. The first array of time encoders 104 used for analog-to-pulse conversion and the lowpass filters 142 used for pulse-to-analog conversion may be implemented within the chip-scale device or separately. The system 100, operating in a pulse domain, may simplify generation of solutions to the unmixing equation of Eq. (4), thus enabling solutions to be generated in substantially real time. Enabling the solution to be generated in substantially real time may be helpful aboard a manned movable platform to provide decision support when quick decisions may be needed (e.g., in combat). In addition, the system 100 may be small and efficient, enabling the system 100 to be supported on board a mobile imaging platform. As a result, the abundance of materials in mixed pixels may be calculated aboard the mobile imaging platform and transmitted back to a ground station or base station. Thus, the system 100 may determine the abundances in substantially real time without consuming bandwidth for transmission of raw data from the mobile imaging platform to the base station or ground station.

Figure 2:
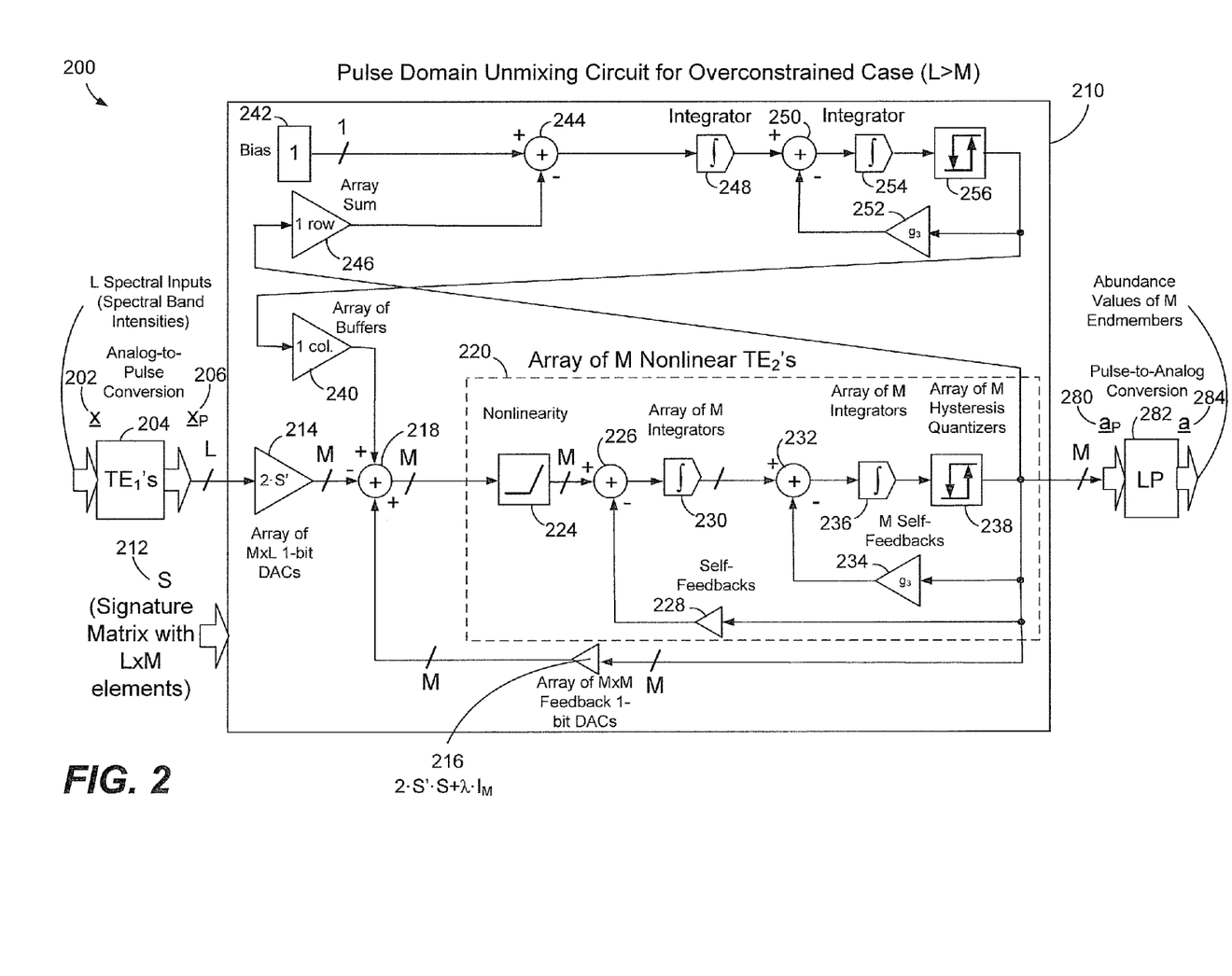
FIG. 2 is a block diagram depicting a particular embodiment of a system configured to unmix hyperspectral data in a pulse domain in an overconstrained case.

FIG. 2 is a block diagram depicting a particular embodiment of a system 200 configured to unmix hyperspectral image data in a pulse domain in an overconstrained case. Referring to FIG. 2, captured analog data 202 is received from an imaging device as a vector, x, having L values that correspond to measured intensity values in each of the L spectral bands being measured. The analog data 202 is presented to a set of L first time encoders 204 that convert the analog data 202 into corresponding pulse domain data, $x_p$, 206. In a particular embodiment, the set of first time encoders 204 includes L time encoders, i.e., one time encoder for each of the L spectral bands. The pulse domain data $x_p$ 206 is submitted to a pulse domain unmixing circuit 210. The pulse domain unmixing circuit 210 also receives a signature matrix S 212. The signature matrix S 112 includes information regarding spectral bands, L, for each considered material, M.

In the pulse domain unmixing circuit 210, the pulse domain data $x_p$ 206 is presented to a first array of DACs 214. The first array of DACs 214 is configured to multiply the pulse domain data $x_p$ 206 by a transpose of the signature matrix S 212 (denoted as S'). In a particular embodiment, the DACs 214 are further configured to double the weight of the pulse domain data $x_p$ 206, i.e., 2·S'. An output of the first array of DACs 214 includes M values that are applied to a negative input of first summing junctions 218. Positive inputs of the first summing junctions 218 receive an output of a second array of DACs 216 as a feedback signal from an output of the pulse domain unmixing circuit 210 and feedback signals from devices supplementing a set of second nonlinear time encoders 220 of the pulse domain unmixing circuit 210. The second array of DACs 216 is adapted to apply a quantity, 2·S', multiplied by the signature matrix, S. The second array of DACs 216 combines each row of the L rows to yield an output current, $I_M$, that is a sum of the DACs 216 in each respective column of the M columns. The second array of DACs 116 is further adapted to apply a tuning parameter, $\lambda$, to the output currents $I_M$.

Outputs of the first summing junctions 218 are presented to the set of second nonlinear time encoders 220. The set of second nonlinear time encoders 220 may include one nonlinear time encoder for each of the considered materials, e.g., M nonlinear time encoders. The second nonlinear time encoders 220 include an array of nonlinearity elements 224 that receive the outputs of the first summing junctions 218. The nonlinearity elements 224 change a negative input to zero and pass along positive values received, thus, imposing the inequality constraint of Eq. (3). Outputs of the nonlinearity elements 224 are presented to a positive inputs of second summing junctions 226. Outputs of the pulse domain unmixing circuit 210, i.e., a plurality of self-feedback signals, are received at a negative input of the second summing junction 226. The self-feedback signals may be received via rate adjustments 228 and 234 that may be used to tune a rate of the self-feedback signals.

Outputs of the second summing junctions 226 are presented to an array of M first integrators 230. Outputs of the array of M first integrators 230 are presented to a positive input of third summing junctions 232, where they are combined with self-feedbacks received via the rate adjustment 234 received at a negative input of the third summing junctions 232. Outputs of the third summing junctions 232 are presented to an array of M second integrators 236. Outputs of the array of M second integrators 236 are presented to an array of M hysteresis quantizers 238. Outputs of the hysteresis quantizers 238 are a vector $a_p$ of pulse domain abundance values 280.

In the embodiment illustrated in FIG. 2, the outputs of the hysteresis quantizers 238 also are presented to an array summer 246. An output of the array summer 246 is received at a negative input of a fourth summing junction 244 that also receives a tunable bias input 242 at a positive input of the fourth summing junction 244. An output of the fourth summing junction 244 is presented to an integrator 248. An output of the integrator 248 is presented to a positive input of a fifth summing junction 250. A negative input of the fifth summing junction 250 receives a feedback path via a rate adjustment 252. The output of the fifth summing junction 250 is presented to an integrator 254. The output of the integrator 254 is received by a hysteresis quantizer 256. The output of the hysteresis quantizer 256, in addition to being presented to the negative input of the fifth summing junction 250 via the feedback path, is presented to an array of buffers 240. The array of buffers 240 stores M values that are presented to the first summing junction 218 as described above.

The pulse domain abundance values 280 are presented to M pulse-to-analog converters (e.g., low pass filters 282) that generate a vector a including abundance values 284 in an analog domain. The abundance values 284 represent, in the analog domain, the portions of materials present in the area of study of the particular pixel.

In a particular embodiment, the pulse domain unmixing circuit 210 of FIG. 2 may be implemented in a single chip-scale device. The first array of time encoders 204 used for analog-to-pulse conversion and the lowpass filters 282 used for pulse-to-analog conversion may be implemented within the chip-scale device or separately. The system 200, operating in a pulse domain, may simplify generation of the solution of the unmixing equation of Eq. (3), thus enabling the solution to be generated in substantially real time. Enabling the solution to be generated in substantially real time may be helpful aboard a manned movable platform to provide decision support when quick decisions may be needed (e.g., in combat). In addition, the system 200 may be small and efficient enabling the system 200 to be supported aboard a mobile imaging platform. As a result, the abundance of materials in mixed pixels may be calculated aboard the mobile imaging platform and transmitted back to a ground station or base station. Thus, the system 200 may determine the abundances in substantially real time without consuming bandwidth for transmission of raw data from the mobile imaging platform to the base station or ground station.

Figure 3:
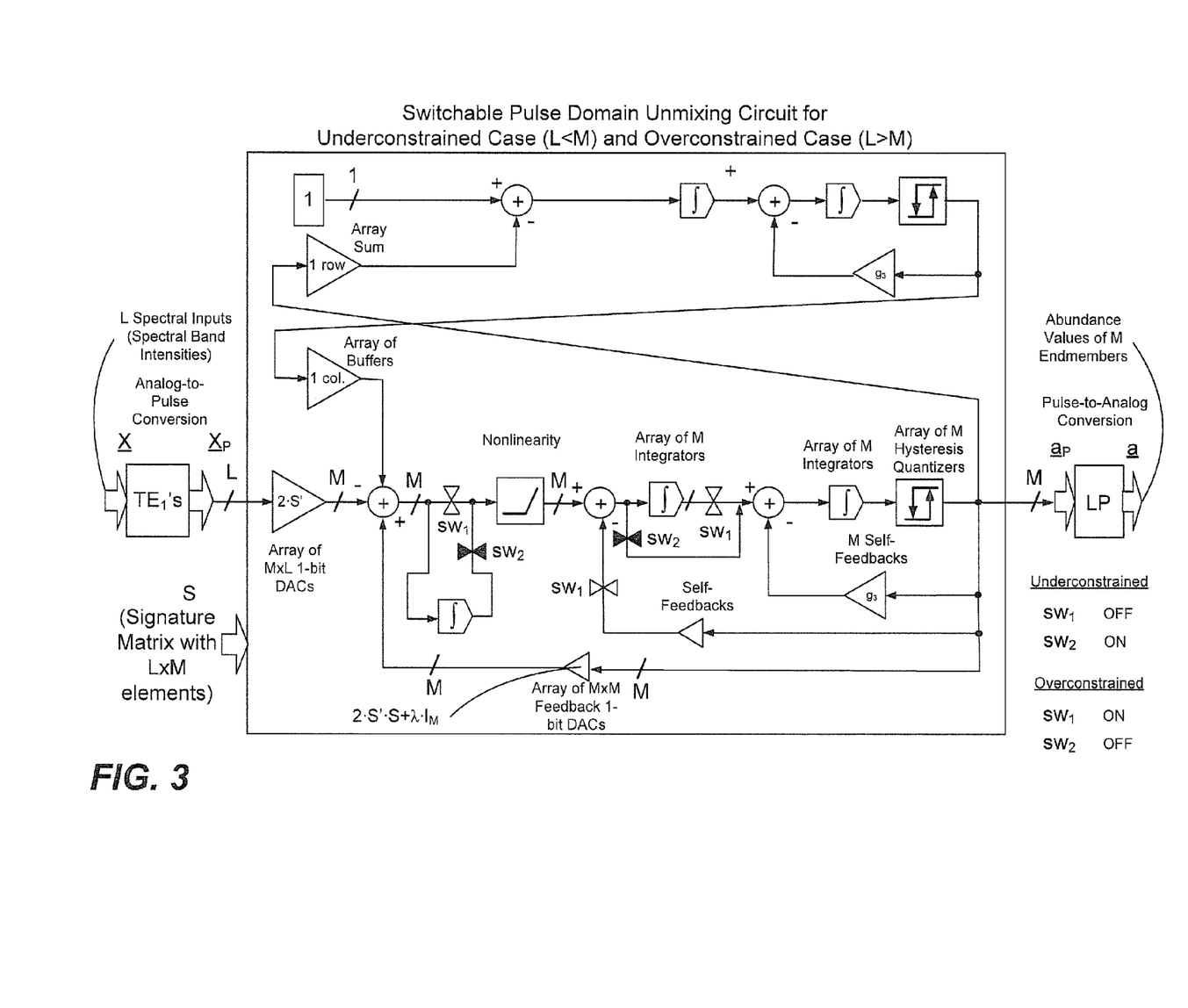
FIG. 3 is a block diagram of particular embodiment of a system including a switchable circuit for unmixing hyperspectral imaging data in an underconstrained case or an overconstrained case.

FIG. 3 is a block diagram of a system 300 including a switchable circuit adapted to unmix hyperspectral imaging data in an underconstrained case or in an overconstrained case. The system 300 includes one or more switches that may be used to bypass or incorporate branches of a pulse domain unmixing circuit 310 that enable processing data in either underconstrained cases or overconstrained cases.

In the embodiment illustrated in FIG. 3, the system 300 includes first switches 319, 325, and 329 (designated $SW_1$ in FIG. 3) and second switches 321 and 327 (designated $SW_2$ in FIG. 3). In an underconstrained case, the first switches 319, 325, and 329 are set to an "OFF" or open position, while the second switches 321 and 327 are set to an "ON" or closed position. By contrast, in an overconstrained case, the first switches 319, 325, and 329 are set to an "ON" or closed position, while the second switches 321 and 327 are set to an "OFF" or open position. In general, as discussed further below, when the first switches 319, 325, and 329 are open and the second switches 321 and 327 are closed, the pulse domain unmixing circuit 310 parallels the pulse domain unmixing circuit 110 of FIG. 1. Similarly, when the first switches 319, 325, and 329 are closed and the second switches 321 and 327 are open, the pulse domain unmixing circuit 310 parallels the pulse domain unmixing circuit 210 of FIG. 2.

Referring to FIG. 3, captured analog data 302 is received from an imaging device as a vector, x, having L values that correspond to measured intensity values in each of the L spectral bands being measured. The analog data 302 is presented to a set of L first time encoders 304 that convert the analog data 302 into corresponding pulse domain data, $x_p$, 306. In a particular embodiment, the set of first time encoders 304 includes L time encoders, i.e., one time encoder for each of the L spectral bands. The pulse domain data 306 is provided to the pulse domain unmixing circuit 310. The pulse domain unmixing circuit 310 also receives a signature matrix S 312. The signature matrix S 312 includes information regarding spectral bands, L, for each considered material, M.

In the pulse domain unmixing circuit 310, the pulse domain data $x_p$ 306 is presented to a first array of DACs 314. The first array of DACs 314 is configured to multiply the pulse domain data $x_p$ 306 by a transpose of the signature matrix S 312 (denoted as S'). In a particular embodiment, the DACs 314 are further configured to double the weight of the pulse domain data $x_p$ 306, i.e., 2·S'. Outputs of the first array of DACs 314 are M values that are applied to negative inputs of first summing junctions 318. Positive inputs of the first summing junctions 318 receive outputs of a second array of DACs 316 as a feedback signal from outputs of the pulse domain unmixing circuit 310. The second array of DACs 316 is adapted to apply a quantity, 2·S', multiplied by the signature matrix S. The second array of DACs 316 combines each of row of the L rows to yield an output current, $I_M$, that is a sum of the DACs 316 in each respective column of the M columns. The second array of DACs 316 is further adapted to apply a tuning parameter, λ, to the output currents $I_M$.

Outputs of the first summing junctions 318 are selectively routed based on positions of the first switch 319 and the second switch 321. In an underconstrained case, the first switch 319 is open and the second switch 321 is closed. As a result, the outputs of the first summing junctions 318 are first passed through integrators 323 before being passed to inputs of nonlinearity elements 324. By contrast, in an overconstrained case, the first switch 319 is closed and the second switch 321 is open. As a result, the outputs of the summing junctions 318 are passed directly to inputs of the nonlinearity elements 324 without first passing through the integrators 323. The nonlinearity elements 324 change a negative input to zero and pass along positive values received. Outputs of the nonlinearity elements 324 are presented to a positive input of second summing junctions 326.

In an underconstrained case, the first switches 325 and 329 are open and the second switch 327 is closed. As a result, outputs of the second summing junctions 326 bypass a first array of M integrators 330 en route to positive inputs of third summing junctions 332. In an overconstrained case, the first switches 325 and 329 are closed and the second switch 327 is open. As a result, outputs of the second summing junctions 326 are presented to the first array of M integrators 330 then passed to positive inputs of the third summing junctions 332. Also, the second summing junctions 326 receive signals from self-feedbacks 328 at negative inputs of the second summing junctions 326.

The third summing junctions 332 combine self-feedbacks received via a rate adjustment 334 received at a negative input of the third summing junction 332. Outputs of the third summing junctions 332 are presented to a second array of M integrators 336. Outputs of the second array of M integrators 336 are presented to an array of M hysteresis quantizers 338. Outputs of the hysteresis quantizers 338 are an array $a_p$ including pulse domain abundance values 380.

In the embodiment illustrated in FIG. 3, the outputs of the hysteresis quantizers 338 also are presented to an array summer 346. An outputs of the array summer 346 is received at a negative input of fourth summing junctions 344 that also receives a tunable bias input 342 at a positive input of the fourth summing junctions 344. An output of the fourth summing junctions 344 is presented to an integrator 348. An output of the integrator 348 is presented to a positive input of a fifth summing junction 350. At a negative input, the fifth summing junction 350 receives a feedback path via a rate adjustment 352. Output of the fifth summing junction 350 is presented to an integrator 354. Output of the integrator 354 is received by a hysteresis quantizer 356. Output of the hysteresis quantizer 356, in addition to being presented to the fifth summing junction 350 via the feedback path, is presented to an array of buffers 340. The array of buffers 340 has M values to correspond to the M values presented at the output of the array of DACs 314.

The pulse domain abundance values 380 are presented to M pulse-to-analog converters (e.g., low pass filters 382) that generate a vector a including the abundance values 384 in an analog domain. The abundance values 384 represent, in the analog domain, the portions of materials present in the area of study of the particular pixel.

In a particular embodiment, the pulse domain unmixing circuit 310 of FIG. 3 may be implemented in a single chip-scale device. The first array of time encoders 304 used for analog-to-pulse conversion and the lowpass filters 382 used for pulse-to-analog conversion may be implemented within the chip-scale device or separately. The system 300, operating in a pulse domain, may simplify generation of solutions to the unmixing equations of Eq. (3) and Eq. (4), thus enabling solutions to be generated in substantially real time for both overconstrained and underconstrained cases. Enabling the solution to be generated in substantially real time may be helpful aboard a manned movable platform to provide decision support when quick decisions may be needed (e.g., in combat). In addition, the system 300 may be small and efficient, enabling the system 300 to be supported aboard a mobile imaging platform. As a result, the abundance of materials in mixed pixels may be calculated aboard the mobile imaging platform and transmitted to a ground station or base station. Thus, the system 300 may determine the abundances substantially in real time and without consuming bandwidth for transmission of raw data from the mobile imaging platform to the base station or ground station.

Figure 4:
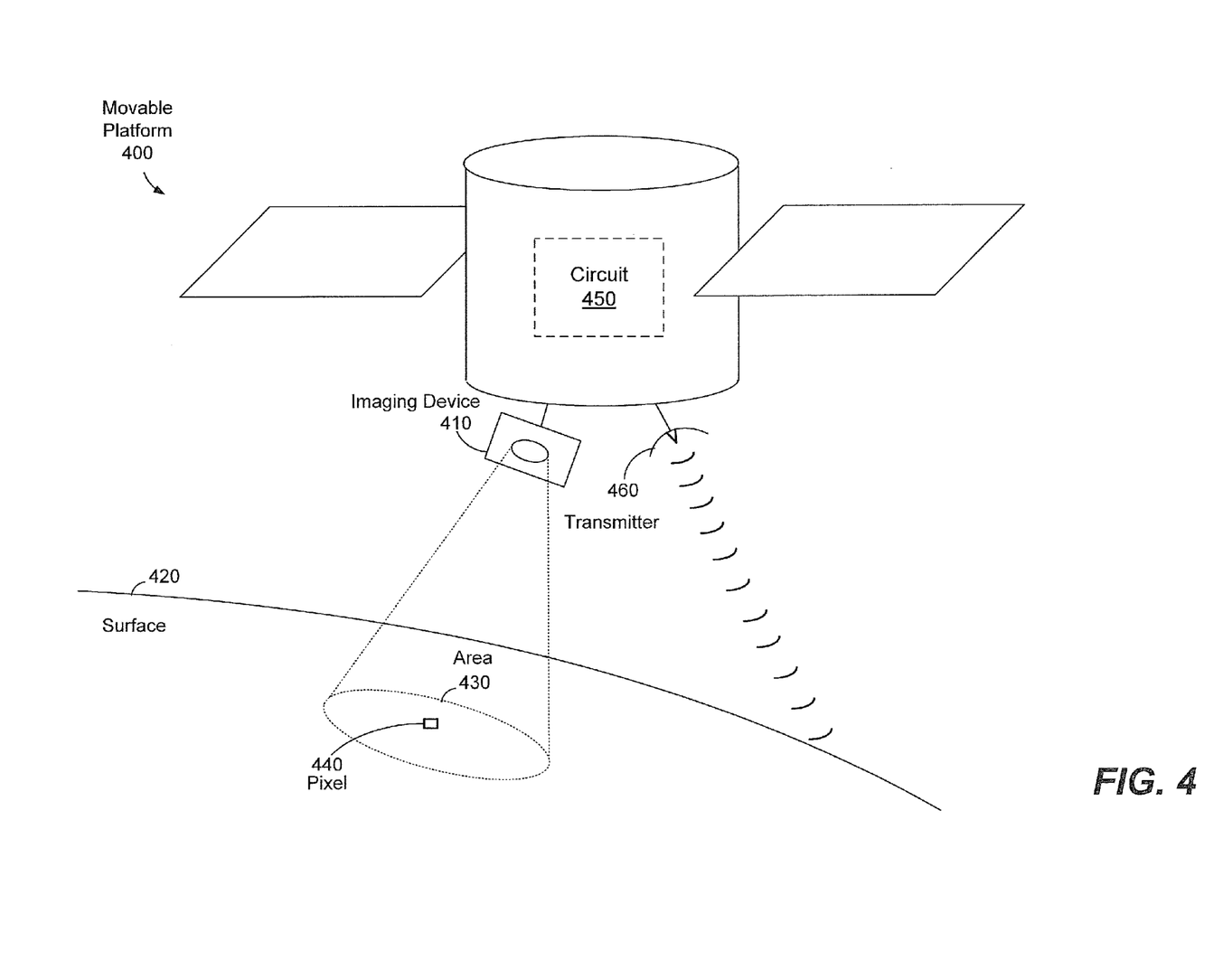
FIG. 4 is a diagram of a particular embodiment of a movable platform.

FIG. 4 is a diagram of a particular embodiment of a movable platform 400 supporting an imaging device 410. The movable platform 400 may include a circuit 450 for unmixing hyperspectral imaging data gathered by the imaging device 410. The movable platform 400 also may include a transmitter 460 to transmit the unmixed imaging data to a receiving station (not shown in FIG. 4). The movable platform 400 may be implemented in a number of forms, such as manned aircraft, unmanned aerial vehicles, satellites, land-based vehicles, water-based vehicles, or other movable platforms. In another embodiment, the imaging device 410 and the circuit 450 are based on a stationary platform.

The movable platform 400 uses the imaging device 410 to collect imaging data of a surface 420 over which the movable platform 400 travels. In one example, each frame of data captured by the imaging device 410 may span an area 430. The frame of data may include a plurality of pixels. A pixel 440 may correspond to a portion of the area 430 captured by an imaging element of the imaging device 410. The pixel 440 may represent surface features that include one or more materials. If the pixel 440 includes spectral intensities that indicate multiple materials are present, the pixel 440 is a mixed pixel for which unmixing may be performed by the circuit 450. The circuit 450 may employ one or more of the embodiments of unmixing systems 100, 200, and 300 of FIGS. 1, 2, and 3, respectively. According to a particular embodiment, hyperspectral data is unmixed aboard the movable platform 400, and may be processed in substantially real time. Enabling the solution to be generated in substantially real time may be helpful aboard a manned movable platform to provide decision support when quick decisions may be needed (e.g., in combat). In an embodiment deployed on an unmanned movable platform, the unmixed hyperspectral data, indicating abundances of materials in each of the pixels, may be determined aboard the movable platform and transmitted via the transmitter 460 to a base station or ground station (not shown in FIG. 4) without consuming bandwidth that would be required to transmit the raw data.

Figure 5:
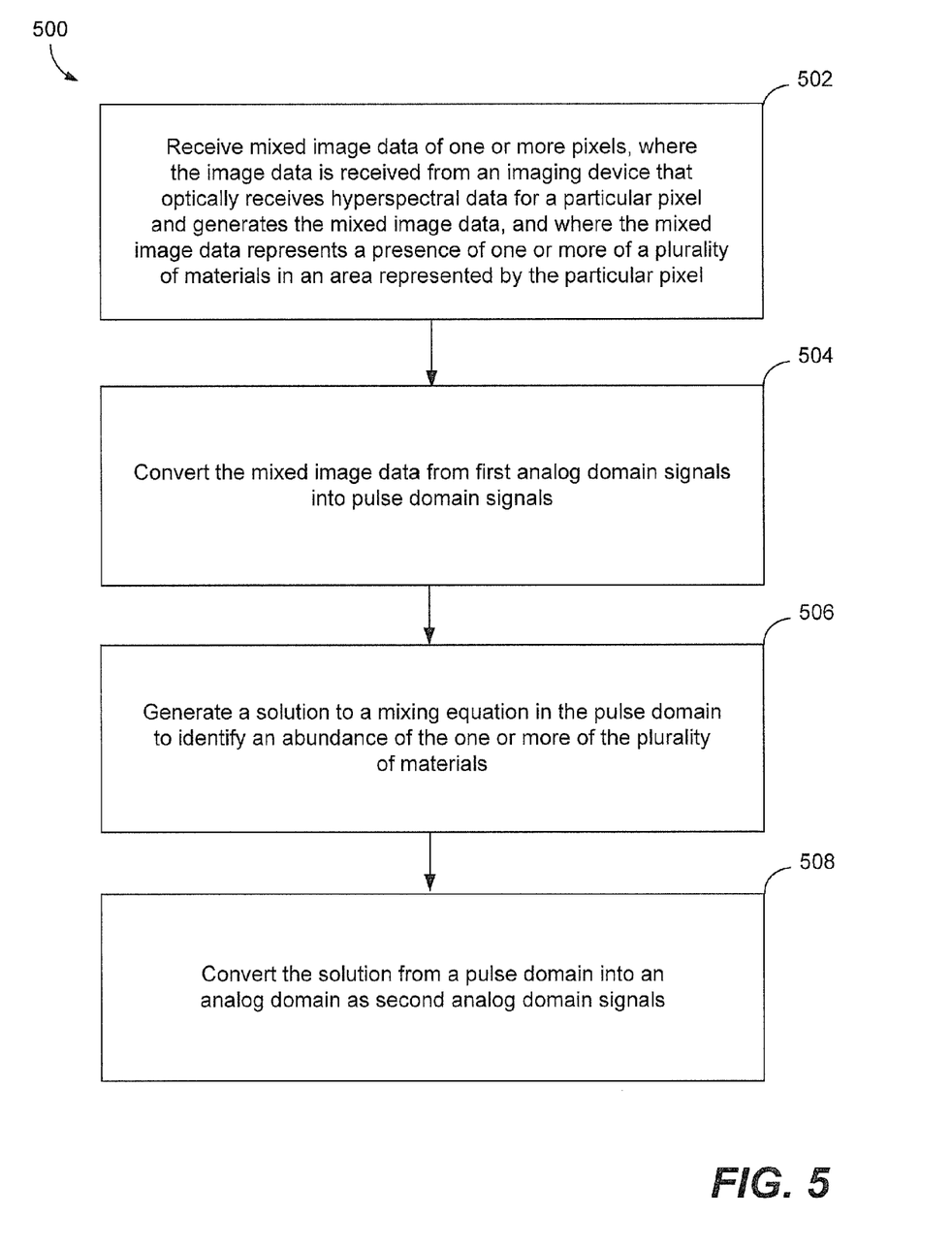
FIG. 5 is a flow diagram of a particular embodiment of a method of unmixing hyperspectral imaging data.

FIG. 5 is a flow diagram of a particular embodiment of a method 500 of unmixing hyperspectral imaging data. Mixed image data of one or more pixels is received, at 502. The image data is received from an imaging device, such as the imaging device 410 of FIG. 4, which optically senses hyperspectral data for a particular pixel and generates the mixed image data. The mixed image data includes spectral data indicating a presence of one or more of a plurality of materials in an area represented by the particular pixel. The mixed image data may be converted from first analog domain signals into pulse domain signals, at 504. The first analog domain signals, for example, may be converted into pulse domain signals by an array of time encoders, such as the time encoders 104, 204, or 304 of FIG. 1, 2, or 3, respectively. A solution to a mixing equation is generated in the pulse domain to identify an abundance of the one or more of the plurality of materials, at 506. For an underconstrained case, the solution may be generated using the system 100 of FIG. 1 or the system 300 of FIG. 3 when configured to operate in an underconstrained case. For an overconstrained case, the solution may be generated using the system 200 of FIG. 2 or the system 300 of FIG. 3 when configured to operate in an overconstrained case. The solution to the unmixing problem in the pulse domain is converted from s pulse domain into an analog domain as second analog domain signals, at 508. The conversion to the analog domain may be accomplished using lowpass filters, such as the lowpass filters 142, 282, or 382 of FIG. 1, 2, or 3, respectively.

Figure 6:
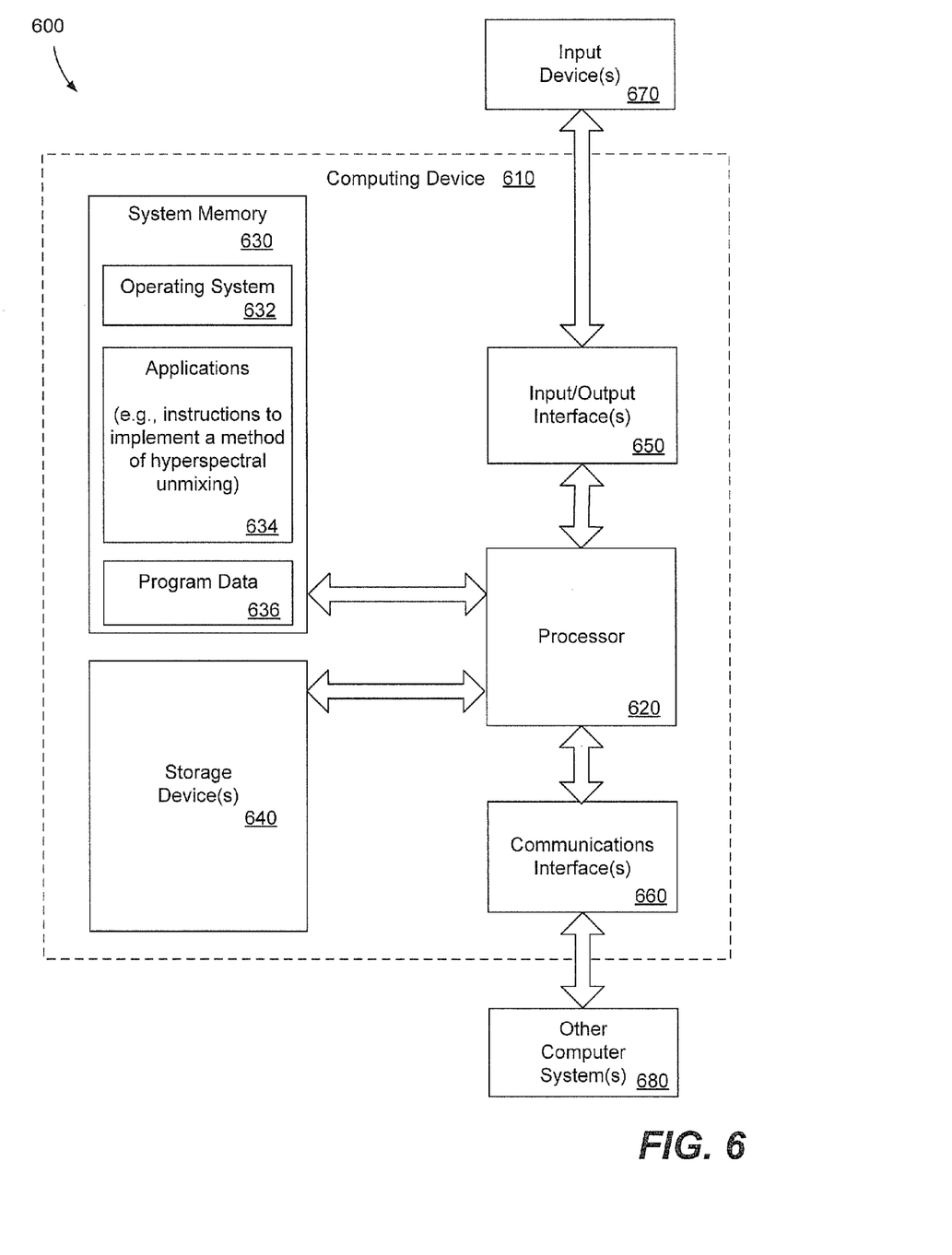
FIG. 6 is a block diagram of a general purpose computer system operable to implement embodiments of the disclosed computer-implemented methods and computer-executable instructions.

FIG. 6 is a block diagram of a general purpose computer system 600 operable to implement embodiments of disclosed computer-implemented methods and computer-executable instructions. The computer system 600 may be positioned aboard a movable platform such as the movable platform 400 of FIG. 4. In an illustrative embodiment, a computing device 610 may include at least one processor 620. The processor 620 may be configured to execute instructions to implement a method of hyperspectral unmixing. The processor 620 may communicate with a system memory 630, one or more storage devices 640, and one or more input devices 670 (such as the imaging device 410 of FIG. 4) via input/output interfaces 650. The processor 620, via one or more communications interfaces 660 (such as the transmitter 460 of FIG. 4) also may communicate with one or more other computer systems 680.

The system memory 630 may include volatile memory devices, such as random access memory (RAM) devices, and nonvolatile memory devices, such as read-only memory (ROM), programmable read-only memory, and flash memory. The system memory 630 may include an operating system 632, which may include a basic/input output system for booting the computing device 610 as well as a full operating system to enable the computing device 610 to interact with users, other programs, and other devices. The system memory 630 may also include one or more application programs 634, such as instructions for configuring the computing system 610 to operate as a pulse domain processing system, as previously described. The system memory 630 also may include program data 636, such as captured imaging data or unmixed hyperspectral imaging data, as previously described.

The processor 620 also may communicate with one or more storage devices 640. The storage devices 640 may include nonvolatile storage devices, such as magnetic disks, optical disks, or flash memory devices. In an alternative embodiment, the storage devices 640 may be configured to store the operating system 632, the applications 634, the program data 636, or any combination thereof. The processor 620 may communicate with the one or more communication interfaces 660 to enable the computing device 610 to communicate with other computing systems 680.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method of unmixing hyperspectral image data, the method comprising:
    receiving mixed image data of one or more pixels, wherein the mixed image data is generated by an imaging device that captures hyperspectral data, and wherein the mixed image data includes sensed spectral band intensities of materials in an area represented by a particular pixel;
    converting the mixed image data from first analog domain signals into pulse domain signals in a pulse domain, wherein the pulse domain is distinct from a digital domain;
    generating a solution to a mixing equation in the pulse domain to identify abundances of one or more of the materials based on the sensed spectral band intensities by comparing the sensed spectral band intensities to reference spectral band intensities of a set of considered materials, wherein the mixing equation indicates a mathematical relationship between the sensed spectral band intensities and the reference spectral band intensities; and
    converting the solution from the pulse domain into an analog domain as second analog domain signals.

2. The method of claim 1, wherein a number of the reference spectral band intensities is greater than a number of materials of the set of considered materials.

3. The method of claim 2, wherein the solution to the mixing equation is generated subject to a first constraint requiring that a sum of the abundances of the one or more materials be equal to one and subject to a second constraint that each of the abundances be greater than or equal to zero.

4. The method of claim 1, wherein a number of the reference spectral band intensities is smaller than a number of materials of the set of considered materials.

5. The method of claim 4, wherein the solution to the mixing equation is generated subject to a sparsity constraint requiring that the one or more materials include fewer than all of the considered materials.

6. The method of claim 1, wherein the mixed image data is converted from the first analog domain signals to the pulse domain signals using feedback from outputs of an array of one bit digital to analog converters coupled to outputs of an array of non-linear time encoders, wherein the array of the one bit digital to analog converters is configured to multiply the pulse domain signals.

7. The method of claim 1, wherein the solution to the mixing equation is generated using an array of non-linear time encoders, wherein each of the non-linear time encoders includes one or more integrators, one or more non-linearity limiters, one or more hysteresis quantizers, and one or more feedback loops to inputs of the one or more integrators.

8. The method of claim 7, wherein the array of non-linear time encoders includes a number of time encoders corresponding to a number of materials in the set of considered materials.

9. The method of claim 1, wherein the imaging device receives the sensed spectral band intensities as optical data and converts the optical data into the mixed image data.

10. The method of claim 9, wherein the imaging device is positioned on a movable platform configured to pass over a surface that includes the area represented by the particular pixel.

11. The method of claim 10, wherein the solution is generated and converted from the pulse domain into an analog domain as the second analog domain signals on the movable platform using a low pass filter, the method further comprising transmitting data corresponding to the second analog domain signals from the moveable platform to a receiver.

12. A hyperspectral unmixing circuit, comprising:
    an analog domain-to-pulse domain converter to convert hyperspectral image data including sensed spectral band intensities from first analog domain signals to pulse domain signals in a pulse domain, wherein the pulse domain is distinct from a digital domain; and
    a pulse domain processing circuit including one or more non-linear time encoders to generate a solution to a mixing equation in the pulse domain, wherein the solution identifies a plurality of materials corresponding to the sensed spectral band intensities of a particular pixel in the hyperspectral image data based on a set of reference spectral band intensities corresponding to a set of considered materials, wherein the mixing equation indicates a mathematical relationship between the sensed spectral band intensities and the reference spectral band intensities.

13. The hyperspectral unmixing circuit of claim 12, further comprising a pulse domain-to-analog domain converter configured to receive the solution to the mixing equation in the pulse domain and to convert the solution into the analog domain, wherein the analog domain-to-pulse domain converter includes a time encoder.

14. The hyperspectral unmixing circuit of claim 13, wherein the pulse domain-to-analog domain converter includes an array of digital-to-analog converters.

15. The hyperspectral unmixing circuit of claim 12, wherein the hyperspectral unmixing circuit is configured to generate the solution as the hyperspectral image data is collected.

16. The hyperspectral unmixing circuit of claim 12, wherein each of the one or more non-linear time encoders includes one or more integrators, one or more non-linearity limiters, one or more hysteresis quantizers, and one or more feedback loops to inputs of the one or more integrators.

17. The hyperspectral unmixing circuit of claim 16, wherein the pulse domain processing circuit is switchable between an overconstrained configuration and an underconstrained configuration, wherein the overconstrained configuration is adapted to generate the solution when there are more reference spectral band intensities than there are considered materials, and wherein the underconstrained configuration is adapted to generate the solution when there are fewer reference spectral band intensities than there are considered materials.

18. The hyperspectral unmixing circuit of claim 17, wherein, in the overconstrained configuration, outputs of the one or more non-linearity limiters are provided to first and second arrays of integrators, wherein the first array of integrators receives a feedback from outputs of an array of hysteresis quantizers and the second array of integrators receives feedback from an array of digital-to-analog converters coupled to the output of the array of hysteresis quantizers.

19. A system, comprising:
a movable platform configured to move over a surface;
an imaging device coupled to the movable platform, the imaging device configured to generate hyperspectral image data including sensed spectral band intensities corresponding to one or more materials on the surface;
a circuit coupled to the movable platform, the circuit, comprising:
an analog domain-to-pulse domain converter configured to convert the hyperspectral image data received from first analog domain signals to pulse domain signals;
a pulse domain processing circuit including one or more non-linear time encoders to generate data that is associated with a solution to a mixing equation in the pulse domain, wherein the pulse domain is distinct from a digital domain, wherein the data identifies the one or more materials on the surface based on a set of reference spectral band intensities corresponding to a set of considered materials, and wherein the mixing equation indicates a mathematical relationship between the sensed spectral band intensities and the set of reference spectral band intensities; and
a pulse domain-to-analog domain converter to convert the data to second analog domain signals indicating the materials on the surface.

20. The system of claim 19, further comprising a transmitter configured to receive the second analog domain signals from the circuit and to transmit the second analog domain signals to a receiving station, wherein the data in the pulse domain is associated with an output of a time encoder.

21. A system comprising:
an analog domain-to-pulse domain converter configured to convert mixed image data from first analog domain signals into pulse domain signals in a pulse domain, the mixed image data representing sensed spectral band intensities of materials in an area represented by a particular pixel, wherein the pulse domain is distinct from a digital domain;
a pulse domain processor configured to receive the pulse domain signals and to solve a mixing equation to generate a solution identifying one or more of the materials in the area based on a set of reference spectral band intensities corresponding to a set of considered materials, wherein the mixing equation indicates a mathematical relationship between the sensed spectral band intensities and the set of reference spectral band intensities, and wherein there are fewer reference spectral band intensities in the set of reference spectral band intensities than there are considered materials in the set of considered materials; and
a pulse domain-to-analog domain converter configured to convert the solution from the pulse domain into second analog domain signals.

22. The system of claim 21, wherein the analog domain-to-pulse domain converter comprises instructions executable by a computer system and stored on a non-transitory computer-readable storage medium to convert the mixed image data from the first analog domain signals into the pulse domain signals in the pulse domain.

23. The system of claim 21, wherein the analog domain-to-pulse domain converter comprises circuit elements to convert the mixed image data from the first analog domain signals into the pulse domain signals in the pulse domain.

24. The system of claim 21, wherein the pulse domain processor comprises instructions executable by a computer system and stored on a non-transitory computer-readable storage medium to receive the pulse domain signals representing the mixed image data and to solve the mixing equation to generate the solution.

25. The system of claim 21, wherein the pulse domain processor comprises circuit elements to receive the pulse domain signals representing the mixed image data and to solve the mixing equation to generate the solution.

26. The system of claim 21, wherein the pulse domain-to-analog domain converter comprises instructions executable by a computer system and stored on a non-transitory computer-readable storage medium to convert the solution from the pulse domain into the second analog domain signals.

27. The system of claim 21, wherein the pulse domain-to-analog domain converter comprises circuit elements to convert the solution from the pulse domain into the second analog domain signals.

28. The system of claim 21, wherein the pulse domain processor solves the mixing equation subject to a sparsity constraint that requires that the materials corresponding to the sensed spectral band intensities include fewer than all of the considered materials.

29. The hyperspectral unmixing circuit of claim 16, wherein the one or more integrators include pulse domain signal inputs and outputs coupled to the one or more non-linearity limiters.

30. The hyperspectral unmixing circuit of claim 29, wherein inputs of the one or more integrators are coupled to outputs of the one or more non-linearity limiters and to one or more digital-to-analog converters.

* * * * *